UNITED STATES PATENT OFFICE.

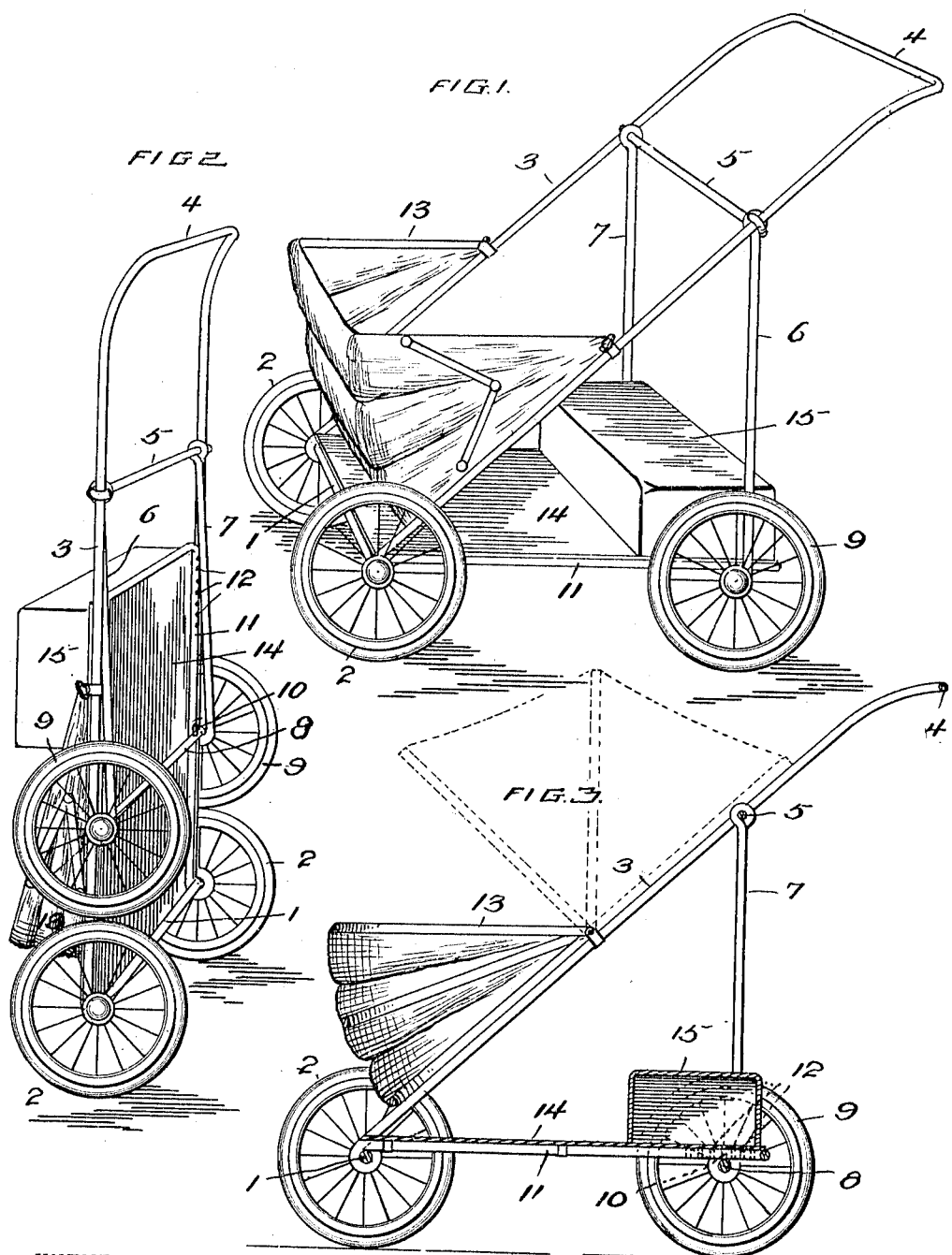

WILLIAM MORE DECKER, OF BUFFALO, NEW YORK.

CHILD'S FOLDING CARRIAGE.

1,102,248.

Specification of Letters Patent.

Patented July 7, 1914.

Application filed December 7, 1912. Serial No. 735,431.

*To all whom it may concern:*

Be it known that I, WILLIAM MORE DECKER, a citizen of the United States, residing at Buffalo, in the county of Erie and State of New York, have invented new and useful Improvements in Children's Folding Carriages, of which the following is a specification.

My invention relates to baby carriages or go-carts, and more particularly to that class of such articles as are adapted to be conveniently collapsed and folded for easy handling when not in use.

The object of my invention is to provide a go-cart in which the handle is readily adjustable to different heights.

Another object thereof is to provide a pivoted platform frame adapted to be collapsed upon the handle-bar frame when not in use and supported upon the rear axle bar for use.

A further object of my invention is to provide a pivoted frame for the support of the rear axle bar and adapted to be compactly folded when not in use.

Another object thereof is to produce a collapsible go-cart in which the wheel base or distance between the front and rear wheels may be adjustably shortened or lengthened, and a still further object thereof is to provide a more simple, cheap and efficient article of said class than has heretofore been produced.

To these ends my invention includes the combination and arrangement of component parts to be hereinafter described and more particularly pointed out in the claims.

In the accompanying drawings in which like reference characters indicate similar parts, Figure 1, is a perspective view of the invention in its operative position, Fig. 2 is a bottom perspective of the invention in its folded position, and Fig. 3 is a vertical sectional view, and shows the means employed to secure the frame to the rear axle.

Referring more specifically to the drawings, the numeral 1 designates the front axle of a baby carriage constructed in accordance with my invention and upon each extremity of which is a wheel 2. Pivoted by each of its free extremities to the front axle 1 is an upwardly extending U-shaped frame 3 the upper extremity of which forms the handle 4. Connecting the side bars of the frame 3 is a bar 5, and pivoted to this bar and depending therefrom are two rods 6 and 7, which are rigidly secured to the rear axle 8, on opposite extremities of which are the wheels 9. The rear axle 8 is provided near each extremity with up-standing integral lugs 10 the purpose of which will be described later. Pivoted to the front axle is a rearwardly extending U-shaped frame 11 which is provided upon its longitudinal sides with a plurality of openings 12 to engage the up-standing lugs 10 on the rear axle 8, and lock the parts in immovable position.

A top 13 is pivoted to the U-shaped frame 3 which may be clamped in an upright position and when in the position shown in dotted lines forms a dash-board as well as a receptacle for packages or the like. The U-shaped frame 11 is adapted to support the bed 14 of the go-cart, and is provided with a suitable seat 15.

When it is desired to adjust the handle to different heights it is only necessary to lift the U-shaped frame 11 and disengage the openings 12 from the lugs 10 and move the rear wheels 9 either forward or backward and engage any one of the openings 12 with the lugs 10 on the rear axle 8 and thus lock the parts against movement, which, it will be appreciated will vary the distance between the front and rear wheels, thus adjusting the wheel base as preferred to regulate the center of gravity over the rear wheel. To fold the go-cart, the U-shaped frame 11 is lifted to disengage the openings 12 from the lugs 10 on the rear axle 8, and move the rear wheels 9 forward to their fullest extent as shown in Fig. 2 of the drawings.

What is claimed is:—

1. A folding go-cart, comprising a front axle and a rear axle, a handle frame pivoted to the front axle, depending links pivoted to the handle and connected to the rear axle, a platform-frame pivoted to the front axle at one end and supported adjacent its opposite extremity by the rear axle, and means for removably securing the platform frame on said rear axle.

2. A folding go-cart comprising a front axle, a handle pivoted to the front axle, depending links pivoted to the handle, a rear axle secured to the lower extremity of the depending links, a U-shaped frame pivoted to the front axle and adjustably secured to the rear axle.

3. A folding go-cart comprising a front and rear axle, a handle-frame pivoted to the front axle, a platform-frame pivoted to the front axle and supported adjacent to its opposite extremity by the rear axle, and means for adjusting the distance between said front and rear axles on said platform-frame.

WILLIAM MORE DECKER.

Witnesses:
WILSON F. STURM,
E. A. OLDAY.

Copies of this patent may be obtained for five cents each, by addressing the "Commissioner of Patents, Washington, D. C."